July 2, 1963 E. J. GARGINI 3,096,395

VELOCITY-MODULATED COLOUR TELEVISION RECEIVERS

Filed July 17, 1957 3 Sheets-Sheet 1

Inventor
E. J. Gargini
By Glascock Downing & Seebold
Attys.

July 2, 1963 E. J. GARGINI 3,096,395

VELOCITY-MODULATED COLOUR TELEVISION RECEIVERS

Filed July 17, 1957 3 Sheets-Sheet 2

Inventor
E. J. Gargini
By Glascock Downing & Seebold
Attys.

VELOCITY-MODULATED COLOUR TELEVISION RECEIVERS

Filed July 17, 1957 3 Sheets-Sheet 3

Inventor
E. J. Gargini
By Glascock Downing & Seebold
Attys.

United States Patent Office 3,096,395

Patented July 2, 1963

3,096,395

VELOCITY-MODULATED COLOUR TELEVISION RECEIVERS

Eric John Gargini, Yiewsley, West Drayton, England, assignor to Electric & Musical Industries Limited, Hayes, England, a company of Great Britain Filed July 17, 1957, Ser. No. 672,458
Claims priority, application Great Britain July 19, 1956
11 Claims. (Cl. 178—5.4)

Figure 1:
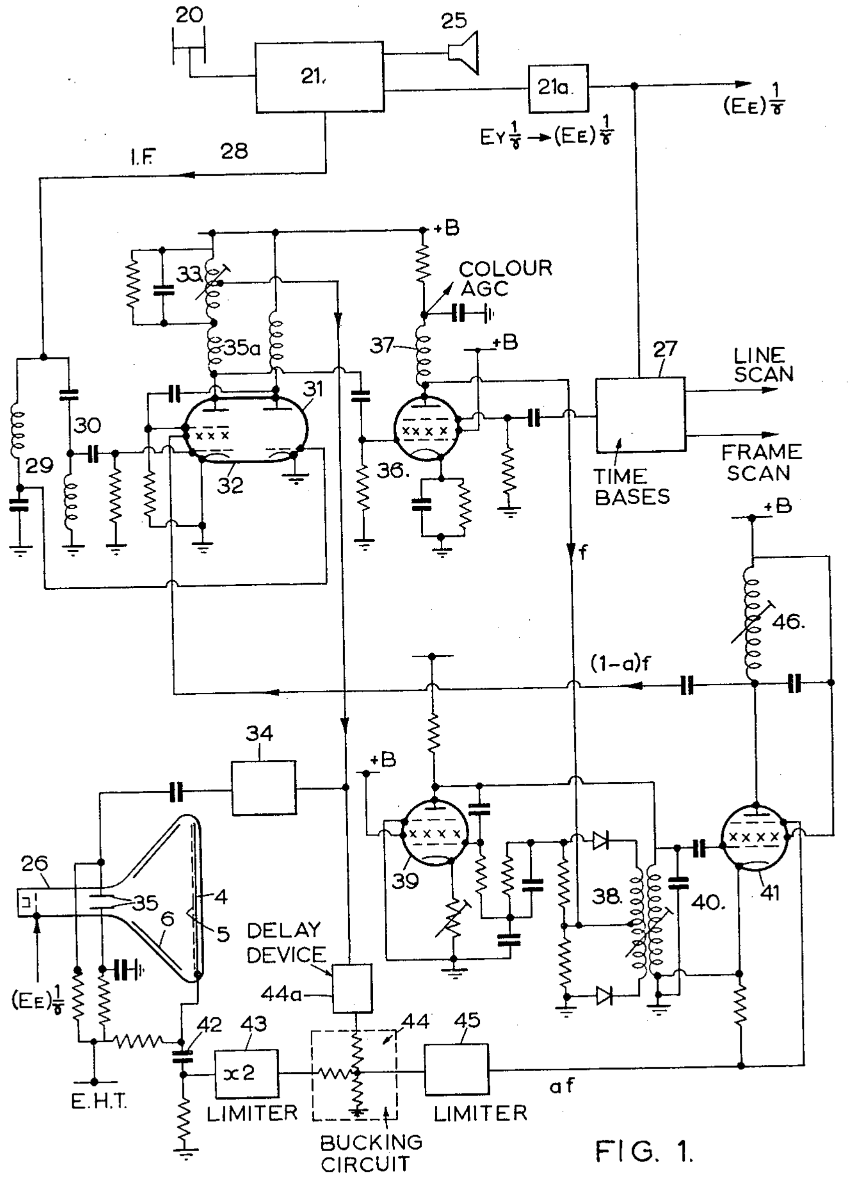

This invention relates to colour television receivers.

Various proposals have been made for the construction of colour television receivers and in general such receivers are relatively complicated, compared with monochromatic receivers, and therefore relatively costly. Many colour television receivers at present being manufactured employ cathode ray image reproducing tubes having three guns. Such tubes are in themselves expensive, they give rise to problems of registration and necessitate three wideband video output stages.

The object of the present invention is to provide an improved television receiver of relatively simple construction, requiring only a single cathode ray image reproducing tube with only a single gun the beam of which is controlled in intensity.

According to the present invention there is provided a colour television receiver having a cathode ray image reproducing tube the fluorescent screen of which comprises a cyclic array of parallel phosphor strips transverse to the line scanning direction and emitting different colours when excited by the cathode ray beam; means for producing from received television signals a first received signal component variable to represent the brightness of the picture to be reproduced, a second received signal component variable to represent the hue of the picture to be reproduced and a third received signal component variable to represent the saturation thereof; means for producing a line scanning waveform for the beam of said tube having a first substantially linear component periodic at the line scanning frequency, thereby to tend to cause the beam to cross the cycles of phosphor strips with a predetermined frequency, and a second component periodic at a centre frequency equal to said predetermined frequency and modulated in phase in response to said second received signal component, whereby said cathode ray beam is caused preferentially to excite a selected strip or selected strips in each cycle of said phosphor strips but to dwell on each cycle for a substantially constant time; saturation control means for varying the excitation of said selected strips relative to the excitation of the whole cycle of phosphor strips in response to said third received signal component; and means for modulating the intensity of the cathode ray beam in response to said first received signal component.

The term "saturation" herein and in the claims is used to denote a ratio which gives a measure of the purity of the dominant hue, purity being the inverse of the dilution of the dominant hue by white light. The ratio varies between unity for a saturated colour and zero for a white, and therefore the term as used herein and in the claims denotes a quantity different from that denoted by the amplitude of the chrominance signal according to the N.T.S.C. specification, since that amplitude represents the intensity of the dominant hue without regard to the degree of dilution by white.

The invention is based on the fact that any colour can be regarded as composed of white together with a component of predetermined hue, the amount of white being zero in a saturated colour. In a colour television receiver according to the invention if the scanning velocity of the beam in the line scanning direction is uniform, and the phosphor efficiencies are adjusted in manufacture the beam will excite the different phosphors for equal times and reproduce white. On the other hand if the scanning of the beam is varied the beam can be caused to dwell for different times on the different phosphor strips and therefore reproduce a desired colour; it will remain however for the same time on each group of phosphor strips. For example, assuming that the phosphor strips are arranged in groups of three, each group consisting of a red phosphor, a green phosphor and a blue phosphor, a green colour can be reproduced by causing the beam to dwell on the green strips of successive groups and to pass rapidly (theoretically instantaneously) over the red and blue strips. Similarly a pastel green can be produced by so controlling the line scanning waveform of the beam and possibly also the focus of the beam that the beam dwells on each of the phosphor strips, but dwells for a long time on the green strips compared with the red and blue strips so as to mix a desired proportion of white with green to reproduce the desired pastel shade. Moreover as the beam takes substantially the same time to cross each group of phosphor strips, a brightness modulation of the reproduced picture can be produced simply by modulating the intensity of the beam.

As will be explained in the following description, the control of the line scanning waveform of the beam is preferably produced by superimposing an oscillation on the line scanning waveform which is modulated in phase in dependence upon the hue of a colour to be reproduced and which is modulated in amplitude in dependence upon the saturation of the colour. The invention is therefore especially applicable to colour television systems such as described in the specifications of United States application No. 651,707 and United States patent application No. 666,422 in which colour information is broadcast from a transmitter by phase modulating a carrier wave to represent hue and by amplitude modulating the same or another carrier wave to represent saturation. The invention is of course also applicable to receivers in which hue and saturation signals are derived at a receiver from colour information transmitted in other forms.

The present invention is capable of producing simple colour television receivers inasmuch as the detection of the colour information is carried out at the surface of the reproducing tube so that a substantial degree of circuit economy is obtained.

Figure 2:
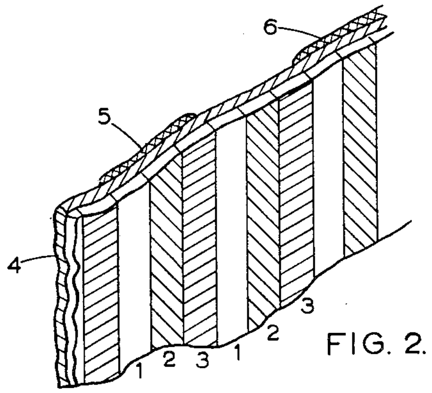
Figure 3:
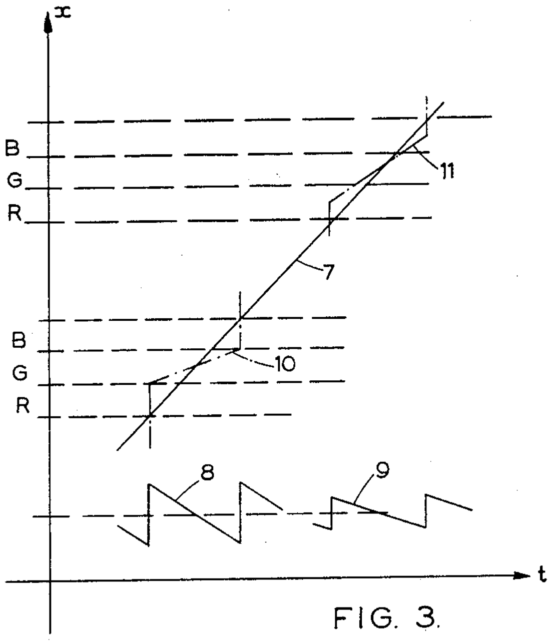
Figure 4:
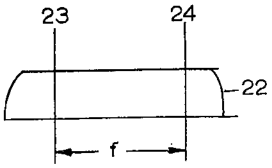
Figure 5:
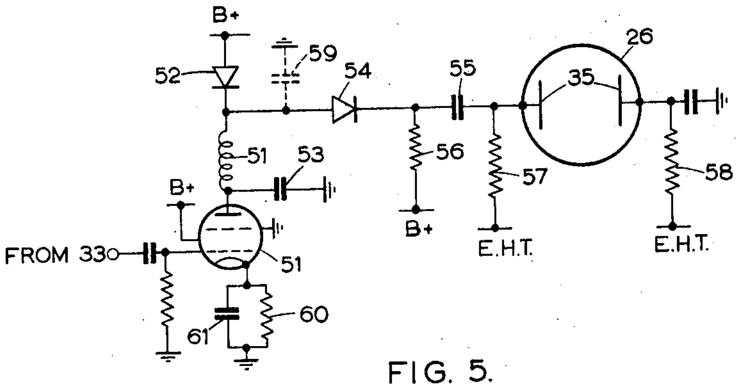
Figure 6:
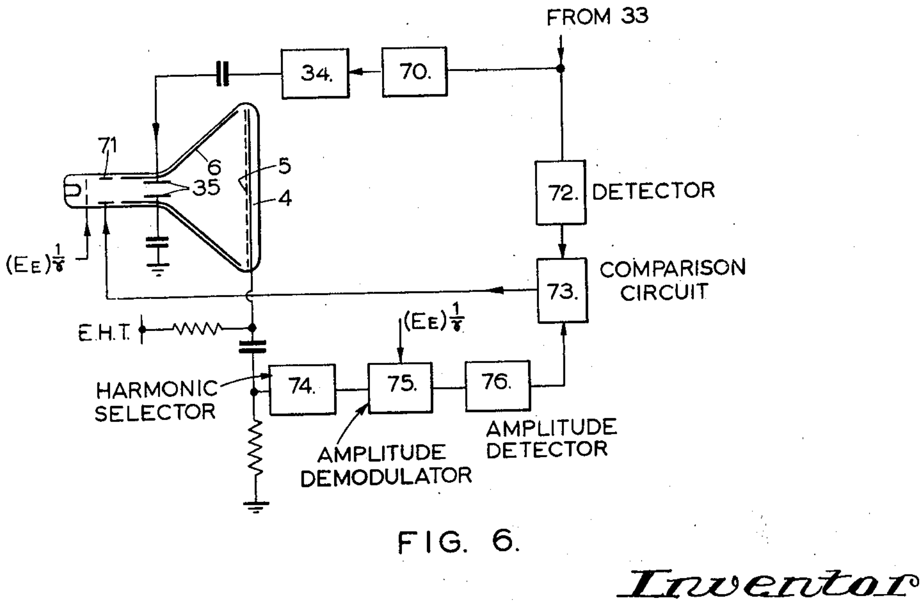

In order that the invention may be clearly understood and readily carried into effect, the invention will be described with reference to the accompanying drawings, in which:

FIGURE 1 illustrates partly in block form, one example of a colour television receiver according to the present invention, FIGURE 2 illustrates diagrammatically a fragment of the screen of the image reproducing tube used in the receiver of FIGURE 1, FIGURE 3 is a diagram explanatory of the operation of FIGURE 1, FIGURE 4 illustrates the intermediate frequency response characteristic of the vision channel of the receiver of FIGURE 1, FIGURE 5 illustrates the construction of a sawtooth waveform generator shown in block form in FIGURE 1, and FIGURE 6 illustrates a modified form of receiver according to the invention.

Referring first to FIGURE 2, the screen of the image reproducing tube comprises a fluorescent screen consisting of an array of parallel strips of phosphors emitting different colours when excited by the cathode ray tube beam. The strips are arranged cyclically in groups of three, each group being called a triplet and consisting of a red strip 1, green strip 2 and a blue strip 3. The fluorescent screen is backed by an aluminium or other metal film 4, in known manner, and indexing strips 5 of a substance, for example magnesium oxide, having a higher secondary-electron emission coefficient than the metal of the backing film, are deposited as indicated over alternate phosphor triplets. The annular electrode of the tube denoted by the reference 6 in FIGURE 1, is separated from, and in operation maintained at a somewhat higher potential than, the backing film 4 so that it collects secondary-electron emission from the indexing strips. A pulse output is therefore obtained from the backing film 4 which gives information about the position of the beam during a line scan. Such an output can, of course, also be obtained from the annular electrode 6 if desired although the screen construction including the indexing strips 5 is preferred for achieving beam indexing in a receiver according to the present invention, other beam indexing means may be used in the reproducing tube. The reproducing tube has a single gun of conventional construction.

In FIGURE 3 the straight line 7 represents a fragment of the normal line scanning waveform applied to the image reproducing tube in the receiver of FIGURE 1, the abscissae in FIGURE 3 representing time and the ordinates representing horizontal deflection. The ordinate increments cut-off by the horizontal dotted lines in FIGURE 3 represent the phosphor strips on the screen of the tube, the colours being as indicated, and it will be observed that when the scanning waveform is linear the beam takes equal times to pass over the different strips and will therefore reproduce white. In accordance with the invention however a "wobble" component is superimposed on the line scanning waveform when a colour has to be reproduced, the wobble component being of symmetrical sawtooth waveform. The average frequency of the wobble component is the triplet frequency, that is the frequency with which the beam traverses the triplets of phosphor strips 1, 2, 3 assuming a constant line scanning velocity though as will appear the wobble component is modulated in phase and in amplitude. Fragments of the wobble component at two different times are represented by the waveform portions 8 and 9 and it will be noted that these portions are of different amplitude. It is however to be assumed that they are of the same phase with respect to the passage of the beam over the phosphor triplets. The amplitude of the portion 8 is predetermined so that the slope of the long flank is approximately ⅔ of the inverse slope of the normal line scanning waveform 7. Therefore if the waveform 8 is superimposed on the waveform 7 the resultant waveform is that represented by the dotted line 10. Assuming that the spot diameter is small compared with the width of a phosphor strip the beam will now dwell for practically the whole of a period of the wobble component on a green strip and will pass virtually instantaneously across the adjacent red and blue strips. The beam will therefore tend to reproduce a saturated green. If the amplitude of the wobble is reduced to 50% without altering the phase as depicted at 9, the resultant waveform now corresponds to the dotted line 11. The beam now dwells on all three strips of the respective strip group, but is longer on the green strip than on the blue and red strips, the time ratio depending on the amplitude of the wobble. In the circumstances represented by 11 the beam will reproduce an unsaturated green, namely approximately 50% saturated, indicating a simple relationship between the amplitude of the wobble component, and the saturation of the emitted colour. It should also be clear from FIGURE 3 that by modulating the phase of the wobble component relative to the passage of the beam over the phosphor triplets the position of the dwell on each triplet can be shifted so that the hue which is reproduced is changed. For example, if the inclined part of the waveform 11 is displaced to cross the red and green strips only, a maximally saturated yellow would be reproduced. Consequently by modulating the wobble component in phase in accordance with the hue component of the received signals and by modulating the amplitude of the wobble component in accordance with the saturation component of received signals colour reproduction can occur. The intensity component of received signals can be reproduced by modulating the intensity of the cathode ray beam by means of a gamma corrected brightness signal given by $$(E_E)^{\frac{1}{\gamma}}=\left(\frac{E_R+E_G+E_B}{3}\right)^{\frac{1}{\gamma}}$$

the symbol $E_E$ being used because this "brightness" corresponds to equi-energy intensity rather than to total luminosity. In the expression $\gamma$ has the usual significance, representing the power of the reproducing tube electron gun characteristic.

The receiver illustrated in FIGURE 1 is intended for the reception of colour television signals in which luminance information is transmitted as amplitude modulation of a main carrier wave, transient hue information is transmitted as phase modulation of the main carrier wave, and the remaining hue information and the saturation information is transmitted as phase and amplitude modulation of a subsidiary carrier wave near the extremity of the upper sideband components of the main carrier wave. The luminance information is the form of a signal $$E_Y^{\frac{1}{\gamma}}$$

conforming to the luminance signal of the N.T.S.C. specification. The hue information consists of the phase of the vector represented by $$\frac{E_R}{E_E}\cos\omega_c t+\frac{E_G}{E_E}\cos\left(\omega_c t+\frac{2\pi}{3}\right)+\frac{E_B}{E_E}\cos\left(\omega_c t+\frac{4\pi}{3}\right)$$

and the saturation information consists of the amplitude of this vector. In the above expression, which represents a symmetrical ratio signal, $E_R$, $E_G$ and $E_B$ have the usual signification, $E_E$ has the significance stated above, and $$\frac{\omega}{2\pi}$$

is the frequency $f$ referred to below. The generation at a transmitter of colour television signals of the kind indicated is described in the specification of United States application Serial No. 666,422 but the present invention is not confined to receivers designed for the reception of such signals. For example, with only minor modifications, the receiver about to be described could be arranged to receive colour television signals of the kind described in the specification of United States application Serial No. 651,707. Furthermore receivers according to the present invention can be arranged for the reception of N.T.S.C. type signals, for example by the provision of means for converting the N.T.S.C. chrominance signal into a symmetrical ratio signal of the form given above. Alternatively, a simpler receiver could be adapted for a transmission in which a brightness signal $$(E_E)^{\frac{1}{\gamma}}$$

as defined above is transmitted instead of $$E_Y^{\frac{1}{\gamma}}$$

In FIGURE 1, the receiver comprises a conventional aerial 20 which applies received signals to a vision and sound channel represented generally by the rectangle 21. The channel 21 is conventional except that it is required to have an intermediate frequency response characteristic as represented by the curve 22 in FIGURE 4. In this figure the line 23 represents the main carrier wave, and the line 24 represents the auxiliary carrier wave. The frequency difference between these carrier waves, denoted by $f$ is termed the chrominance sub-carrier frequency. The demodulated sound signal is applied to a loudspeaker 25 whilst the demodulated luminance signal $$(E_Y)^{\frac{1}{\gamma}}$$

is applied to a converter 21a which converts the signal from the form $$E_Y^{\frac{1}{\gamma}}$$

to the approximate form $$(E_E)^{\frac{1}{\gamma}}$$

using matrixing techniques. The signal $$(E_E)^{\frac{1}{\gamma}}$$

from the converter 21a is applied between the control electrode and cathode of the image reproducing tube 26 and also to the time bases where the synchronising signals are extracted and used in a conventional manner. The time bases are represented in general by the rectangle 27. Another output is taken from the channel 21 via the lead 28 and this output consists of the video signal at intermediate frequency. This signal is applied in parallel to a low pass filter 29 and a high pass filter 30. The low pass filter extracts the main carrier wave and the sideband components due to the phase modulation by the hue signal. The output of the filter 29 is applied to a limiter 31 which removes substantially the amplitude modulation due to the luminance signal. The output of the limiter 31 in turn is applied to the "suppressor" electrode of a mixing valve 32, by way of a conventional coupling circuit. The output of the high pass filter 30 extracts the sideband component due to the phase modulation by the hue information not transmitted by the main carrier wave and to the amplitude modulation by the saturation signal (the subsidiary carrier wave being suppressed at the transmitter) and applies these to the control electrode of the mixing valve 32. The mixing valve 32 receives a third input signal which is applied to its "screen" electrode and this input consists of a sinusoidal oscillation, having a frequency of $(1-a)f$. As aforesaid $f$ is the sub-carrier frequency and $a$ is such that $af$ represents the triplet frequency of the tube 26, when the scanning velocity of the beam thereof in the line scanning direction is uniform as represented by 7 in FIGURE 3. The method of deriving the sinusoidal oscillation of frequency $(1-a)f$ is explained in the following description. The triple mixing process which occurs in the tube 32 (and which may if desired be replaced by two separate mixing processes) produces inter alia oscillations of centre frequency $af$, that is, the triplet frequency, these oscillations being modulated in phase, to represent hue, in a manner corresponding to the original carrier waves, and modulated in amplitude to represent saturation in a manner corresponding to the original chrominance carrier wave. These oscillations appear across a tuned circuit 33 and are applied to a sawtooth waveform generator 34 to generate a sawtooth waveform synchronised with the applied oscillation and exhibiting similar phase and amplitude modulations. A suitable construction for the generator 34 is illustrated in FIGURE 5. The generator output, fragments of which may be represented by 8 and 9 in FIGURE 3, is applied between electrostatic deflecting plates 35 biassed to E.H.T. The deflecting plates 35 may be additional to the normal deflecting means for the tube 26, which may comprise deflecting coils. The output of the generator 34 thus superimposes a wobble on the line scanning deflection of the beam in the manner described with reference to FIGURE 3.

The mixing tube 32 also produces oscillations of the chrominance sub-carrier frequency which are unmodulated during the occurrence of synchronising signals (in known manner), being received colour burst or so-called reference oscillations. These oscillations appear across an inductor 35a which is tuned appropriately by stray capacities and the oscillations across the inductor 35a are applied to a pentode valve 36 which functions as a colour burst gate. Thus, the anode current in the valve 36 is normally cut-off by the suppressor electrode but anode current is permitted to flow when line flyback pulses are applied from the time base unit 27 with suitable polarity. When this occurs reference oscillations appear across the anode load 37 of the valve 36 and these oscillations are applied to a frequency discriminator of conventional construction denoted in general by the reference 38. The frequency discriminator 38 serves to control a local oscillator in known manner by way of a reactance valve 39, the oscillator comprising in addition to the valve 39 a resonant circuit 40 and the inner section of a valve 41. This oscillator therefore generates oscillations of the chrominance sub-carrier frequency and in the outer section of the valve 41, these oscillations are mixed with oscillations of triplet frequency $af$.

To obtain the oscillation of triplet frequency $af$, indexing signals are derived from the backing film 4 in the cathode ray tube 26. These signals respond to variations in the secondary-electron emission from the backing of the fluorescent screen and as the strips 5 are deposited over alternate triplets 1, 2 and 3 the average fundamental frequency of the indexing signals is half the triplet frequency. However the signals are modulated in phase due to the sawtooth waveform applied to the deflecting plates 35. The indexing signals are furthermore modulated in amplitude in dependence on the beam current which is modulated in response to the brightness signal $$(E_E)^{\frac{1}{\gamma}}$$

The indexing signals are first passed via a capacitor 42 to a frequency doubling and amplitude limiting circuit 43, which may be of conventional construction and is shown, therefore, only in block form. The circuit 43 produces an oscillation the average frequency of which is triplet frequency and which contains only the fundamental frequency and the sideband corresponding to the phase modulation. The resultant oscillation is passed to a bucking circuit 44 to which is applied, in phase opposition to the output of the circuit 43, oscillations from the circuit 33, having therefore the same phase as the sawtooth waveform from the generator 34, the latter oscillation being first passed through a delay device 44a to ensure correct phase relationship. This cancels the sideband of the indexing signals due to the hue information and the resultant indexing signals, any phase modulation of which will now be representative substantially only of non-linearity in the normal line scanning waveform or irregularity of the phosphor triplets is passed through an amplitude limiter 45 to remove amplitude variations which occur when phase cancellation is introduced. The signal thus produced constitutes a local reference oscillation on to which is transposed phase and amplitude modulation representing respectively the hue and saturation information contained in the received signals. Thus the output of the limiter 45 comprises the oscillation of frequency $af$ which is mixed in the outer section of the valve 41 with the oscillation from the local oscillator 40. Inasmuch as secondary emitting material is deposited over the whole of alternate triplets of the fluorescent screen, and extends beyond the edge of the screen, an indexing signal is produced with reliability at half triplet frequency unless the scanning beam is cut-off. If secondary-electron emitting material were to be provided over only single strips of the fluorescent screen, certain indexing pulses would be of very small amplitude, when the velocity of the beam in crossing triplets is very high on a saturated colour for example. Moreover, the phase modulation of the indexing signals due to the phase modulation of the sawtooth waveform applied to the plates 35 is a simple linear function of the latter phase modulation and can be cancelled by a simple bucking circuit as described.

It may be beneficial to employ a notch filter in the $E_Y$ or $E_E$ signal channel to reduce the effect of brightness signal transients on the triplet frequency derived from the annular electrode 6.

If the spacing of the indexing elements in the tube 26 is not exactly uniform, and if the line scannnig waveform 7 is non-linearly distorted, frequency variations will be produced in the indexing waveform related to the change of phase at the deflecting plates 35. It is therefore desirable that the indexing phase control be operative instantaneously. However, delay is inevitable due to the finite band widths of the control circuits and for accurate hue reproduction the phase delay of the control signal must be multiples of $2\pi$ radians. The network 46 is provided to facilitate this phase adjustment.

Some slight contamination in reproduced colours may arise in the receiver illustrated due to the finite size of the scanning spot and due to the finite time occupied by return strokes of the sawtooth waveform from the generator 34. This contamination results in some desaturation of colours reproduced but is in general small enough to be acceptable. It may however be reduced to produce exceptionally high quality image reproduction by beam-gating or switching techniques, for example by modulating the luminance signal at the strip frequency by a fraction of the oscillation applied from the circuit 33 to the sawtooth waveform generator 34, after delaying that oscillation to such an extent as to cause the maxima to occur at the centre of the long flanks of the "wobble" sawtooth waveform. In practice best results are obtained with sinusoidal modulation if the brightness signals are 50 percent modulated by the phase delay oscillation from the circuit 33. If beam switching techniques are adopted, it may be necessary to employ a separate beam in the tube 26 for deriving the indexing signals. Moreover although the use of a sawtooth waveform for producing the wobble is illustrated other waveforms may be employed, for example a sine waveform, which has the advantage of greater simplicity although at the cost of some colour contamination.

The brightness of white portions of the image can be improved if desired by varying the focus of the cathode ray tube 26 in response to the saturation signal.

Referring now to FIGURE 5, the sawtooth waveform generator 34 comprises a pentode valve 50 to the control electrode of which is applied the phase and amplitude modulated oscillation from the circuit 33. The valve 50 has an inductor 51 in series with a unilaterally conductive device 52, say a crystal diode, connected in series in its anode lead whilst a capacitor 53 is connected from the anode to ground. The junction of 51 and 52 is connected by way of a second crystal diode 54 and a series coupling capacitor 55 to one of the plates 35. The cathode of the diode 54 is biassed by way of resistor 56 whilst the plates 35 are biassed as aforesaid from the E.H.T. line by way of resistors 57 and 58. Reference 59 denotes stray capacity shunting the diode 52. A resistor 60 and capacitor 61 connected in parallel in the cathode circuit of valve 50 provide bias for the valve in known manner. At some time during each cycle of the oscillation applied to the control electrode of the valve 50, the anode capacitor 53 ceases to charge through the valve 50 due to the conduction in the valve being diminished below a critical value. This time is dependent on the phase of the oscillation applied to the control electrode and when the transition occurs the capacitor 53 commences to discharge through the inductor 51. As a result the capacitor 59 is charged and being of small capacity compared with 53 it charges to a much higher potential than 53 and quickly cuts-off the diode 52. There is therefore applied to the diode 54 one pulse during each cycle of the applied waveform, the time of this pulse being dependent on the phase and amplitude of the applied waveform. The diode 54 is rendered conducting by the pulse, and the plates 35 are then charged rapidly to a potential corresponding to the pulse amplitude. The pulse at the anode of 54 has however a very short duration and 54 is soon rendered non-conducting and the charge on the plates 35 then discharges relatively slowly through the resistor 56 to generate the long flanks of the sawtooth waveform. The plates 35 therefore provide the storage capacity of the sawtooth waveform generator.

Having regard to the foregoing description of the receiver illustrated in FIGURE 1, it will be understood that it comprises means for producing from received television signals three received signal components. The first of these received signal components represents the brightness of the picture to be reproduced and in the example described is of the composition denoted by the symbol $$(E_E)^{\frac{1}{\gamma}}$$

the second received signal component represents the hue of the picture to be reproduced and is constituted by phase modulation components of the main and subsidiary carrier waves, and the third of the received signal components represents the saturation of the respective hue and is constituted by the amplitude modulation components of the subsidiary carrier wave. The beam of the image reproducing tube 26 scans a television raster on the fluorescent screen of the tube in well known manner, and the waveform which is instrumental in producing the lines of this television raster comprises a first component which is periodic at line scanning frequency and tends to cause the beam to cross the cycles of phosphor strips with a predetermined frequency, this component being that produced in conventional manner by the line time base included in the circuit components represented by the rectangle 27. The line scanning waveform has however a second component, the so called wobble component, which is periodic at a centre frequency equal to the predetermined frequency with which the beam crosses the cycles of phosphor strips. This wobble component is produced by the circuit 34, and by virtue of the coupling from the circuit 33 to the circuit 34 the second component of the line scanning waveform is modulated in phase in response to the second of the aforesaid received signal components in such a way that the cathode ray beam is caused preferentially to excite a selected strip or selected strips in each cycle of the phosphor strips which make up the fluorescent screen but to dwell on each cycle of the phosphor strips for a substantially constant time. Moreover, inasmuch as the wobble component of the line scanning waveform is modulated in amplitude in response to the third of the aforesaid received signal components, namely the amplitude modulation of the subsidiary carrier wave, the saturation of the reproduced colour is controlled by varying the excitation of the selected strip or strips relative to the excitation of the whole cycle of phosphor strips. The application of the first of the received signal components, namely that denoted by $$(E_E)^{\frac{1}{\gamma}}$$

to the control electrode of the tube 26 causes the intensity of the cathode ray beam to be modulated in accordance with the brightness of the picture to be reproduced. The generation of the wobble component of the line scanning waveform is controlled by the second of the aforesaid received signal components, by the colour bursts which are of reference phase and by the indexing signal obtained from the backing film in the cathode ray tube 26. To this end a local reference signal is obtained, namely from the circuit 46, any phase modulation of which relative to the colour bursts is representative substantially only of line scanning irregularities in the tube 26, this local reference signal being derived in response to the indexing signal, the colour bursts, and an oscillation obtained from the circuit *44a*, which has the same frequency as and has a phase modulation corresponding to the wobble component of the line scanning waveform. The local reference signal is mixed in the valve 32 with the second of the received signal components to provide from circuit 33 a phase control signal which determines the phase of the wobble component of the line scanning waveform produced by the circuit 34.

Although amplitude modulation of the wobble component of the line scanning waveform is the preferred method of controlling the saturation of reproduced colours, other methods of controlling the saturation may be adopted. For example the focus of the cathode ray tube may be varied in response to the saturation information of received signal, the intensity of the beam being again controlled in response to brightness information as in FIGURE 1. Such a modification of the invention is illustrated in FIGURE 6 in which only a small part of a receiver is shown, the remainder being for example of the same construction as that illustrated in FIGURE 1. A sawtooth waveform is again applied between the deflector plates 35 from the generator 34 but in this case the input to the generator is passed through a limiter 70 to remove amplitude modulation and cause the sawtooth waveform generated by the generator 34 to be of substantially constant amplitude. A fraction of the waveform applied to the limiter 70 is also applied to a focus control electrode 71 by way of an amplitude detecting circuit 72 which recovers the saturation information, and by way of a comparison circuit 73. The comparison circuit 73 receives a second input which is derived from the indexing signals taken from the backing film 4, by way of a harmonic selecting filter 74, an amplitude demodulator 75 and an amplitude detector 76. The comparison circuit operates as a focus control on the principle that the indexing signal is a function of the spot size and therefore a function of the focus. For example it can be shown that the indexing signal should have a substantial sine waveform when the tube is reproducing white and should have a substantially rectangular waveform when the tube is reproducing a saturated primary colour. When reproducing white, there is substantially no harmonic content in the indexing signal, whereas when representing a saturated primary colour certain harmonics and in particular even harmonics are present. The harmonic selecting filter 74 is arranged to select an even harmonic for example, the second, and the focus circuit of the tube 26 is initially adjusted so that when the spot is defocused to reproduce white there is a minimum content of this harmonic. Furthermore as the spot size decreases as the saturation increases, there is for each value of saturation, some definite amplitude of the selected harmonic assuming a constant beam intensity. The amplitude will however vary as a function of the brightness signal $$(E_E)^{\frac{1}{\gamma}}$$

and the amplitude demodulator is arranged to remove the amplitude modulation due to the brightness signal. For this purpose a suitable fraction of the brightness signal is injected in any suitable manner into the demodulator 75. Thereafter the amplitude of the selected harmonic is detected in the circuit 76, which may be a conventional diode detector followed by an amplifier which amplifies the output of the detector to a level suitable for direct comparison with the saturation signal from the detector 72. The output of the comparison circuit 73 therefore represents the departure of the actual focus of the beam in the tube 26 from the value represented by the received saturation signal, the output being applied in such a sense as to tend to reduce the departure to zero.

To reduce contamination of white reproduced in the receiver of the form shown in FIGURE 6 it may be preferable to use a focusing system which produces a beam of square or rectangular cross section.

In the form of the invention shown in FIGURE 6, the modulation of the scanning velocity of the beam required to reproduce hue may be produced by a scanning waveform generated initially as a staircase waveform. Separate generation of a sawtooth waveform 7 and a wobble component as in FIGURE 1 is then unnecessary. A staircase waveform can be produced by a pulse integrating circuit which is arranged to generate steps substantially at triplet frequency, the phase of the steps being controlled by the phase of the signals derived from the limiter 70.

In the mode of operation of the receiver depicted in FIGURE 1, the slope and amplitude of the sawtooth waveform for a saturated primary colour may differ from that shown of the waveform 8 in FIGURE 3, and in this case the relationship between the required amplitude of the sawtooth waveform (or other wobble component) and the amplitude of the saturation signal differs from the simple relationship indicated for the case of FIGURE 3. In a practical form of the invention, using a spot diameter of half the width of a phosphor strip, a sawtooth amplitude for a saturated primary colour of ⅝ of the triplet width was found to give good colour reproduction. The spot diameter was taken as that of the circle at which the light intensity was 5% of the maximum light intensity of the spot. Furthermore in accordance with the invention it is advantageous that the phosphor strips 1, 2 and 3 should be contiguous, as shown in FIGURE 1 and indeed some overlapping of the strips can be tolerated.

What I claim is:

1. A colour television receiver having a cathode ray image reproducing tube the fluorescent screen of which comprises a cyclic array of parallel phosphor strips transverse to the line scanning direction and emitting different colours when excited by the cathode ray beam; means for producing from received television signals a first signal variable to represent the brightness of the picture to be reproduced and a second signal the phase of which is variable to represent the hue of the picture to be reproduced and the amplitude of which is variable to represent the saturation thereof; means for producing a line scanning waveform for the beam of said tube having a first substantially linear component periodic at the line scanning frequency, thereby to tend to cause the beam to cross the cycles of phosphor strips with a predetermined frequency, and a second component periodic at a centre frequency equal to said predetermined frequency and modulated in phase in response to the phase variations in said second signal, whereby said cathode ray beam is caused preferentially to excite a selected strip or selected strips in each cycle of said phosphor strips but to dwell on each cycle for a substantially constant time; saturation control means for varying the excitation of said selected strips relative to the excitation of the whole cycle of phosphor strips in response to amplitude in said second signal; and means modulating the intensity of the cathode ray beam in response to said first signal.

2. A colour television receiver according to claim 1 comprising means for deriving an indexing signal the phase of which is responsive to the passage of the beam over said phosphor strips; means for producing from received television signals a signal of reference phase, and means responsive to the phase variations in said second signal said indexing signal and said signal of reference phase for producing the second component in said line scanning waveform.

3. A colour television receiver having a cathode ray image reproducing tube the fluorescent screen of which comprises a cyclic array of parallel phosphor strips transverse to the line scanning direction and emitting different colours when excited by the cathode ray beam; means for producing from received television signals a first signal variable to represent the brightness of the picture to be reproduced, a second signal of reference phase and a third signal of which the phase relative to said reference phase is variable to represent the hue of the picture to be reproduced; means for modulating the intensity of the cathode ray beam in response to said first signal, means for producing a line scanning waveform for the beam in said tube having a first substantially linear component periodic at line frequency, thereby tending to cause the beam of the tube to cross the cycles of phosphor strips with a predetermined frequency, and having a second component which is periodic with a centre frequency equal to said predetermined frequency and which is modulated in phase so that said cathode ray beam is caused preferentially to excite a selected strip or selected strips in each cycle of said phosphor strips but to dwell on each cycle for a substantially constant time; means for deriving an indexing signal of which the phase is responsive to the passage of the beam over said phosphor strips; means responsive to said second and third signals and said indexing signal for producing a local reference signal any phase modulation of which relative to said reference phase is representative substantially only of scanning irregularities; and means for combining said third signal and said local reference signal to produce said second component of the line scanning waveform, whereby said second component produces modulation in the line scanning velocity of said beam at such times as to change the hue of light produced in the fluorescent screen in accordance with the phase variations in said third signal.

4. A receiver according to claim 1, said means for producing the line scan waveform including a sawtooth waveform generator for producing said second component.

5. A receiver according to claim 1 said saturation-control means including means for modulating the amplitude of said second component of the line scanning waveform in response to the amplitude in said second signal.

6. A receiver according to claim 1, said saturation control means including means for varying the focus of said cathode ray beam in response to the amplitude of said second signal.

7. A receiver according to claim 2, comprising means for modulating the amplitude of said second component of the line scanning waveform in response to received television signals, so as to cause said amplitude to represent the saturation of the hue represented by the phase of said third component.

8. A receiver according to claim 2 comprising means responsive to received television signals for deriving a signal the amplitude of which is variable to represent the saturation of the respective hue represented by the phase of said third signal, and means for varying the focus of said cathode ray beam in response to said amplitude variable signal.

9. A receiver according to claim 6 comprising indexing means for producing a periodic signal, variations of which are related to the instantaneous position of the beam during a line scan and means for modifying beam focus variations in response to the harmonic content of said indexing signal.

10. A receiver according to claim 1 wherein said means for producing said first signal comprises means for deriving a luminance signal from received television signals, and means for converting said luminance signal into a equi-energy intensity signal thereby to produce said first signal.

11. A colour television receiver having a cathode ray image reproducing tube the fluorescent screen of which comprises a cyclic array of parallel phosphor strips transverse to the line scanning direction and emitting different colours when excited by the cathode ray beam; means for producing from received television signal a first received signal component variable to represent the brightness of the picture to be reproduced, a second received signal component variable to represent the hue of the picture to be reproduced and a third received signal component variable to represent the saturation thereof; means for producing a line scanning waveform for the beam of said tube having a first substantially linear component periodic at the line scanning frequency, thereby to tend to cause the beam to cross the cycles of phosphor strips with a predetermined frequency, and a second component periodic at a centre frequency equal to said predetermined frequency and modulated in phase in response to said second received signal component, whereby said cathode ray beam is caused preferentially to excite a selected strip or selected strips in each cycle of said phosphor strips but to dwell on each cycle for a substantially constant time; saturation control means for varying the excitation of said selected strips relative to the excitation of the whole cycle of phosphor strips in response to said third received signal component; and means for modulating the intensity of the cathode ray beam in response to said first received signal component.

References Cited in the file of this patent

UNITED STATES PATENTS

| | | |
|---|---|---|
| 2,745,899 | Maher | May 15, 1956 |
| 2,773,118 | Moore | Dec. 4, 1956 |
| 2,784,342 | Van Overbeek | Mar. 5, 1957 |
| 2,798,114 | Schlesinger | July 2, 1957 |
| 2,877,295 | Loughlin | Mar. 10, 1959 |
| 2,921,128 | Gibson et al. | Jan. 12, 1960 |
| 2,989,582 | Zworykin et al. | June 20, 1961 |